United States Patent
Samie et al.

(10) Patent No.: US 9,546,719 B2
(45) Date of Patent: Jan. 17, 2017

(54) MULTI-MODE TRANSMISSION FOR VEHICLE POWERTRAIN SYSTEM

(71) Applicant: GM GLOBAL TECHNOLOGY OPERATIONS LLC, Detroit, MI (US)

(72) Inventors: Farzad Samie, Franklin, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 14/533,144

(22) Filed: Nov. 5, 2014

(65) Prior Publication Data

US 2016/0123448 A1    May 5, 2016

(51) Int. Cl.
*F16H 37/02*    (2006.01)

(52) U.S. Cl.
CPC ....... *F16H 37/021* (2013.01); *F16H 2037/026* (2013.01)

(58) Field of Classification Search
CPC ............ F16H 2702/06; F16H 2037/023; F16H 2037/0873; F16H 2037/0886
USPC .......... 74/664, 665 R; 475/210, 213
See application file for complete search history.

(56) References Cited

U.S. PATENT DOCUMENTS

| | | | | |
|---|---|---|---|---|
| 4,530,256 A * | 7/1985 | Hattori | ........ | B60W 10/02 192/48.618 |
| 5,690,576 A * | 11/1997 | Moroto | ........ | F16H 37/0846 475/211 |
| 5,720,686 A * | 2/1998 | Yan | ........ | F16H 37/021 475/211 |
| 5,904,633 A * | 5/1999 | Lee | ........ | F16H 37/021 475/210 |
| 8,105,192 B2 * | 1/2012 | Simon | ........ | F16H 37/021 474/74 |
| 8,123,646 B2 * | 2/2012 | Triller | ........ | F16H 37/021 475/211 |
| 8,915,811 B2 * | 12/2014 | Horiike | ........ | F16H 37/021 474/8 |
| 2012/0209495 A1 * | 8/2012 | Sakai | ........ | B60K 6/485 701/102 |

* cited by examiner

*Primary Examiner* — Ha D Ho
(74) *Attorney, Agent, or Firm* — Quinn Law Group, PLLC

(57) ABSTRACT

A torque transmission device for a powertrain system includes a continuously variable transmission (CVU) arranged in parallel with a transfer gear set. The CVU variator includes a first pulley rotatably coupled to a first rotating member and a second pulley rotatably coupled to a second rotating member. The transfer gear set includes a first gear selectively rotatably coupled to a second gear via activation of a clutch. The clutch includes a first rotating element and a second rotating element that rotate in concert when the clutch is activated. The first rotating element rotatably couples to the first rotating member and the second rotating element rotatably couples to the first gear. The first gear rotates in a fixed ratio with rotation of the second gear when the clutch is activated. The second gear rotatably couples to the second rotating member.

20 Claims, 3 Drawing Sheets

MULTI-MODE TRANSMISSION FOR VEHICLE POWERTRAIN SYSTEM

TECHNICAL FIELD

This disclosure relates to a transmission for a vehicle powertrain, and a method and control system associated therewith.

BACKGROUND

Powertrains having an internal combustion engine coupled to a continuously or infinitely variable transmission (CVT) may be employed to provide tractive effort in vehicles. A characteristic of a CVT includes the capability to continuously change a speed ratio between a minimum input speed/output speed (underdrive) ratio and a maximum input speed/output speed (overdrive) ratio, thus permitting selection of engine operating points that achieve peak efficiency, e.g., a mean-best torque point that is responsive to an operator torque request. As such a continuously variable transmission is capable of steplessly changing through an infinite number of effective gear ratios between a maximum gear ratio and a minimum gear ratio.

Known belt-type CVTs include two pulleys, each having two sheaves. A continuous torque-transfer device, e.g., a belt runs between the two pulleys, with the two sheaves of each of the pulleys sandwiching the belt therebetween. Frictional engagement between the sheaves of each pulley and the belt couples the belt to each of the pulleys to transfer torque from one pulley to the other. One of the pulleys may function as a drive or input pulley so that the other pulley (an output or driven pulley) can be driven by the drive pulley via the belt. The gear ratio is the ratio of the torque of the driven pulley to the torque of the drive pulley. The gear ratio may be changed by moving the two sheaves of one of the pulleys closer together and the two sheaves of the other pulley farther apart, causing the belt to ride higher or lower on the respective pulley.

Known toroidal CVTs include discs and roller mechanisms that transmit power between the discs. The toroidal continuously variable transmission includes at least one input disc rotatably coupled to a torque generator, e.g., an internal combustion engine, and at least one output disc rotatably coupled to the transmission output. The input disc and output disc define a cavity therebetween. The cavity defines a toroidal surface. The roller mechanism is placed within the cavity and is configured to vary the torque transmission ratio as the roller mechanism moves across the toroidal surface. A controlled tilt of the roller mechanism within the cavity changes the relative diameter of engagement of the input disc and output disc and incrementally changes the torque transmission ratio.

SUMMARY

A torque transmission device for a powertrain system is described, and includes a variator of a continuously variable transmission (CVU) arranged in parallel with a transfer gear set. The CVU variator includes a first pulley rotatably coupled to a first rotating member and a second pulley rotatably coupled to a second rotating member. The transfer gear set includes a first gear selectively rotatably coupled to a second gear via activation of a clutch, wherein the clutch includes a first rotating element and a second rotating element that rotate in concert when the clutch is activated. The first rotating element of the clutch rotatably couples to the first rotating member, the second rotating element of the clutch rotatably couples to the first gear, the first gear rotates in a fixed ratio with rotation of the second gear when the clutch is activated, and the second gear rotatably couples to the second rotating member.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
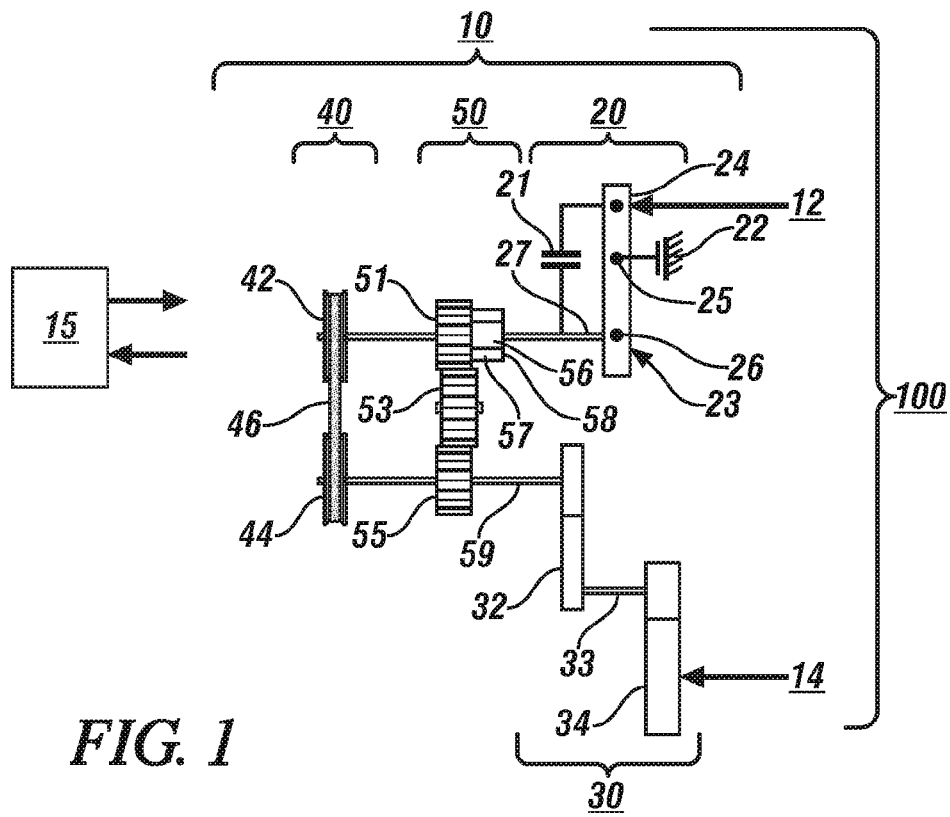
FIGS. 1 through 5 schematically illustrate embodiments of a powertrain system that includes a multi-mode torque transmission device employing a continuously variable transmission unit (CVU) arranged to rotate in parallel with a transfer gear set to transfer torque between an input member and an output member in either a continuously variable state or a fixed gear state, in accordance with the disclosure.

Referring now to the drawings, wherein the depictions are for the purpose of illustrating certain exemplary embodiments only and not for the purpose of limiting the same, FIG. 1 schematically illustrates elements of a powertrain system 100 that includes a multi-mode transmission 10 employing a non-limiting embodiment of a traction-drive continuously variable unit (CVU) 40 of a continuously or infinitely variable transmission (CVT) arranged to rotate in parallel with an embodiment of a transfer gear set 50 to transfer torque between an input member 12 and an output member 14. Each of the embodiments of the multi-mode transmission 10 described herein is 'multi-mode' in that it is capable of transferring torque between the input member 12 and the output member 14 in either a continuously variable mode or a fixed gear mode. In one embodiment, the input member 12 couples to a torque-generative device or prime mover such as an internal combustion engine or an electric machine. In another embodiment, the output member 14 couples to a driveline to transfer torque to tractive wheels.

The torque transmission device 10 preferably includes an input gear set 20 that rotatably couples between the input member 12 and a first rotating member 27. The input gear set 20 includes a planetary gear 23, an activatable clutch 21 and an activatable ground clutch 22. The planetary gear set 23 includes a sun gear 24 that rotatably couples to the input member 12, planet gears (and carrier) 25 and ring gear 26 that couples to the first rotating member 27. Clutch 21 rotatably couples the sun gear 24 and the ring gear 26 when activated. Ground clutch 22 grounds rotation of the planet gears 25 to a transmission case when activated. In operation, torque and rotational speed transfers from the input member 12 through the transmission 10 in a first, e.g., forward direction with activation of clutch 21 and deactivation of ground clutch 22. Torque and rotational speed transfers from the input member 12 through the transmission 10 in a second, e.g., reverse direction with deactivation of clutch 21 and activation of ground clutch 22.

The torque transmission device 10 preferably also includes a differential gear set 30 that rotatably couples between the output member 14 and a second rotating member 59. The differential gear set 30 includes a first gear set 32 coupled to second gear set 34 via rotating member 33, wherein torque and speed output from the second rotating member 59 is multiplied and reduced, respectively, therethrough to the output member 14.

The CVU 40 as illustrated employs a belt-driven variator that includes a first pulley 42 rotatably coupled to a second pulley 44 via a belt 46. The first pulley 42 rotatably couples to the first rotating member 27 and the second pulley 44 rotatably couples to the second rotating member 59. Other elements of the CVU 40 and operation thereof are known and not described in detail herein. Alternatively, the CVU 40 may employ a toroidal variator, or another suitable variator configuration.

The transfer gear set 50 includes a first gear 51, a second gear 55, a coupling mechanism 53 and a clutch 57. The first gear 51 is preferably coaxial with the first rotating member 27 and the second gear 55 is preferably coaxial with the second rotating member 59. In this embodiment, the first and second gears 51, 55 are toothed sprockets and the coupling mechanism 53 is a continuous chain that engages the teeth of both the first and second gears 51, 55. As such, the first and second gears 51, 55 can rotate in concert at a fixed ratio. In one embodiment, the first and second gears 51, 55 are configured in an overdrive ratio such that rotational speed input to the first gear 51 is multiplied through the second gear 55 to the second rotating member 59. Alternatively, the first and second gears 51, 55 can be configured in an underdrive ratio or a unitary (1:1) drive ratio. In this embodiment, the second gear 55 rotatably couples to the second rotating member 59 and rotates in concert at all times.

The clutch 57 is a dog clutch that includes a first element 56 that rotatably couples and locks in rotation with a second element 58 when activated. In one embodiment, the CVU 40 is controlled to synchronize rotations of the first and second elements 56, 58 to effect clutch engagement. A synchromesh configuration may be employed in concert with the CVU 40 to synchronize rotations of the first and second elements 56, 58 to effect clutch engagement in one embodiment. Synchromesh devices and operation are known and not described in detail herein. In this embodiment, the first rotating member 27 couples to the first element 56 of the clutch 57 and the first gear 51 couples to the second element 58 of the clutch 57. When the clutch 57 is disengaged, the first element 56 rotates independently of the second element 58, and thus the first rotating member 27 rotates independently of the first gear 51. Under such conditions, torque transferred from the input member 12 transfers through the CVU 40 to the output member 14. When the clutch 57 is engaged, the first element 56 rotates in concert with the second element 58 and thus the first rotating member 27 rotates in concert with the first gear 51. Under such conditions, torque transferred from the input member 12 transfers through the transfer gear set 50 in a fixed speed and torque ratio to the output member 14. The CVU 40 is preferably disengaged from the transfer gear set 50 during the fixed gear operation. The clutch 57 can be a double-dog clutch with a ring to either engage the first rotating member 27 to the first element 56 while the second element 58 is disengaged, or engage the first rotating member 27 to the second element 58 while the first element 56 is disengaged. Alternatively, another clutch may be employed in addition to clutch 57 to engage and disengage the CVU 40 to shaft 27. When the clutch 57 is a dog clutch, it can be a dog ring moving between two sides to engage either the transfer gear set 50 or the CVU 40. Alternatively, another controllable friction plate clutch can be added between the first gear 51 and the first pulley 42.

Figure 2:
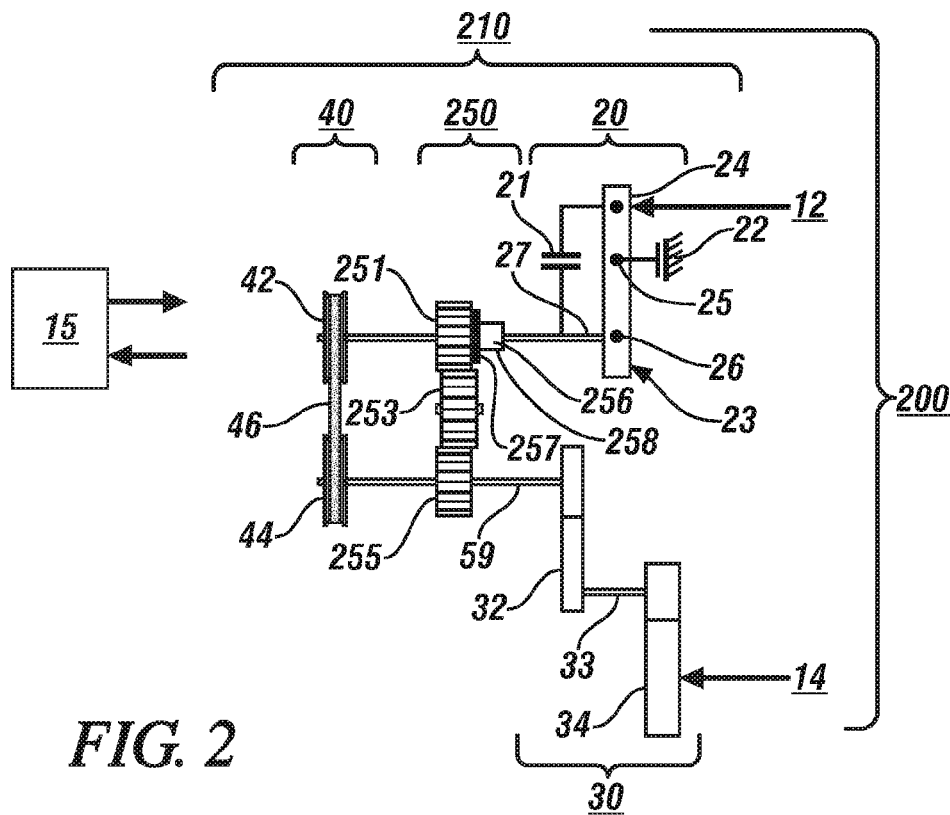

FIG. 2 schematically illustrates elements of another embodiment of a powertrain system 200 that includes a torque transmission device 210 employing a non-limiting embodiment of a continuously or infinitely variable transmission (CVU) 40 arranged to rotate in parallel with an embodiment of a transfer gear set 250 to transfer torque between input member 12 via input gear set 20 and output member 14 via differential gear set 30. In one embodiment, the input member 12 couples to a torque-generative device or prime mover such as an internal combustion engine or an electric machine. In one embodiment, the output member 14 couples to a driveline to transfer torque to tractive wheels. The CVU 40, input member 12, input gear set 20, output member 14 and differential gear set 30 are analogous to the corresponding elements described with reference to FIG. 1.

The transfer gear set 250 includes a first gear 251, a second gear 255, a coupling mechanism 253 and a clutch 257. The first gear 251 is preferably coaxial with the first rotating member 27 and the second gear 255 is preferably coaxial with the second rotating member 59. In this embodiment the first and second gears 251, 255 are toothed sprockets and the coupling mechanism 253 is a continuous chain that engages the teeth of both the first and second gears 251, 255. As such, the first and second gears 251, 255 can rotate in concert at a fixed ratio. In one embodiment, the first and second gears 251, 255 are configured in an overdrive ratio such that rotational speed input to the first gear 251 is multiplied through the second gear 255 to the second rotating member 59. Alternatively, the first and second gears 251, 255 can be configured in an underdrive ratio or a 1:1 ratio. In this embodiment, the second gear 255 rotatably couples to the second rotating member 59 and rotates in concert therewith at all times.

The clutch 257 in this embodiment is a friction clutch that includes a first element 256 and a second element 258. In this embodiment, the first rotating member 27 couples to the first element 256 of the clutch 257 and the first gear 251 couples to the second element 258 of the clutch 257. When the clutch 257 is disengaged, the first element 256 rotates independently of the second element 258, and thus the first rotating member 27 rotates independently of the first gear 251. Under such conditions, torque transferred from the input member 12 transfers through the CVU 40 to the output member 14. When the clutch 257 is engaged, the first element 256 rotates in concert with the second element 258 and thus the first rotating member 27 rotates in concert with the first gear 251. Under such conditions, torque transferred from the input member 12 transfers through the transfer gear set 250 in a fixed speed and torque ratio to the output member 14. The CVU 40 is preferably disengaged from the transfer gear set 250 during the fixed gear operation. The CVU 40 may be disengaged by reducing the clamping forces of the CVU. Alternatively, another clutch may be employed to engage and disengage the CVU 40 to shaft 27. The clutch 257 can be a double-dog clutch with a ring to either engage the first rotating member 27 to the first element 256 while the second element 258 is disengaged, or engage the first rotating member 27 to the second element 258 while the first element 256 is disengaged. Alternatively, another clutch may be employed in addition to clutch 257 to engage and disengage the CVU 40 to shaft 27. When the clutch 257 is a dog clutch, it can be a dog ring moving between two sides to engage either the transfer gear set 250 or the CVU 40.

Alternatively, another controllable friction plate clutch can be added between the first gear 251 and the first pulley 42.

Figure 3:
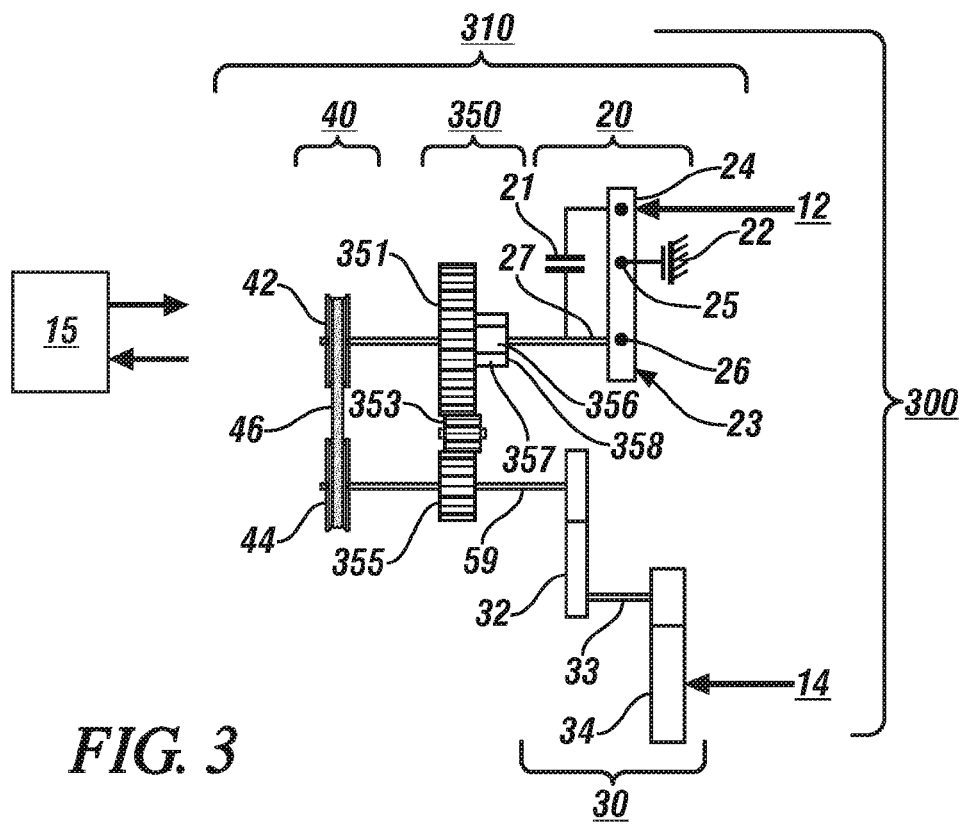

FIG. 3 schematically illustrates elements of another embodiment of a powertrain system 300 that includes a torque transmission device 310 employing a non-limiting embodiment of a continuously or infinitely variable transmission (CVU) 40 arranged to rotate in parallel with an embodiment of a transfer gear set 350 to transfer torque between input member 12 via input gear set 20 and output member 14 via differential gear set 30. In one embodiment, the input member 12 couples to a torque-generative device or prime mover such as an internal combustion engine or an electric machine. In one embodiment, the output member 14 couples to a driveline to transfer torque to tractive wheels. The CVU 40, input member 12, input gear set 20, output member 14 and differential gear set 30 are analogous to the corresponding elements described with reference to FIG. 1.

The transfer gear set 350 is a meshed involute gearset that includes a first gear 351, a second gear 355, an intermediate gear 353 and a clutch 357. The first gear 351 is preferably coaxial with the first rotating member 27 and the second gear 355 is preferably coaxial with the second rotating member 59. In this embodiment, the first and second gears 351, 355 are involute gear elements and the intermediate toothed gear 353 meshingly engages teeth of both the first and second gears 351, 355. As such, the first and second gears 351, 355 can rotate in concert at a fixed ratio and the rotation directions are the same. In one embodiment, the first and second gears 351, 355 are configured in an overdrive ratio such that rotational speed input to the first gear 351 is multiplied through the second gear 355 to the second rotating member 59. Alternatively, the first and second gears 351, 355 can be configured in an underdrive ratio or a 1:1 ratio. In this embodiment, the second gear 355 rotatably couples to the second rotating member 59 and rotates in concert therewith at all times.

In one embodiment, the clutch 357 is a dog clutch that includes a first element 356 that rotatably couples and locks in rotation with a second element 358 when activated, and is analogous to the clutch 57 described with reference to FIG. 1. In one embodiment, the clutch 357 is a friction clutch that includes a first element 356 and a second element 358 when activated, and is analogous to the clutch 257 described with reference to FIG. 2. The CVU 40 is preferably disengaged from the transfer gear set 350 during the fixed gear operation. This can include incorporating a second clutch element into clutch 357 when clutch 357 is a dog clutch. Alternatively, another controllable friction plate clutch can be added between first gear 351 and the first pulley 42.

Figure 4:
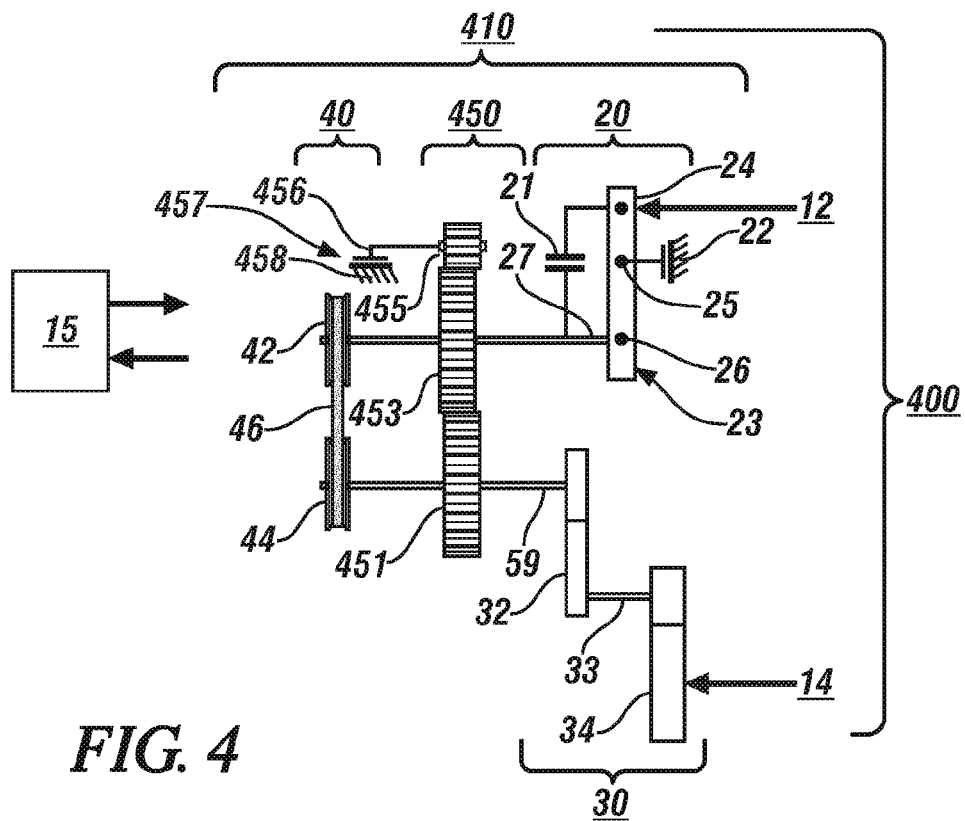

FIG. 4 schematically illustrates elements of another embodiment of a powertrain system 400 that includes a torque transmission device 410 employing a non-limiting embodiment of a continuously or infinitely variable transmission (CVU) 40 arranged to rotate in parallel with an embodiment of a transfer gear set 450 to transfer torque between input member 12 via input gear set 20 and output member 14 via differential gear set 30. In one embodiment, the input member 12 couples to a torque-generative device or prime mover such as an internal combustion engine or an electric machine. In one embodiment, the output member 14 couples to a driveline to transfer torque to tractive wheels. The CVU 40, input member 12, input gear set 20, output member 14 and differential gear set 30 are analogous to the corresponding elements described with reference to FIG. 1.

The transfer gear set 450 is a planetary gear set that includes a sun gear 451, planet gears 453 and concentric carrier, a ring gear 455 and a ground clutch 457. The sun gear 451 is preferably coaxial with and rotatably coupled to the second rotating member 59 and the carrier of the planet gears 453 is preferably rotatably coupled to the first rotating member 27. In one embodiment the sun, planet and ring gears 451, 453 and 455 are involute gear elements. The sun and planet gears 451, 453 rotate in concert. When the ground clutch 457 is disengaged, the sun and planet gears 451, 453 rotate in concert in a non-torque transfer state. When the ground clutch 457 is engaged, rotation of the ring gear 455 is grounded and the sun and planet gears 451, 453 rotate in concert in a torque transfer state.

In one embodiment, the sun and planet gears 451, 453 are configured in an overdrive ratio such that rotational speed input to the sun gear 451 is multiplied through the planet gears 453 to the second rotating member 59. Alternatively, the sun and planet gears 451, 453 can be configured in an underdrive ratio or a 1:1 ratio.

The clutch 457 in one embodiment is a friction clutch that includes a first element 456 and a second element 458. In this embodiment, the ring gear 455 couples to the first element 456 of the clutch 457 and the second element 458 of the clutch 457 is a transmission case ground. When the clutch 457 is disengaged, the first element 456 rotates independently of the second element 458, thus permitting free rotation of the sun gear 451 and the planet gears 453, which allows member 27 to rotate independently of the first gear 451. Under such conditions, torque transferred from the input member 12 transfers through the CVU 40 to the output member 14. When the clutch 457 is engaged, rotation of the ring gear 455 is grounded, coupling the rotation of sun gear 451 and the first rotating member 27 with the rotation of the planet gears 453 and the second rotating member 59. Under such conditions, torque transferred from the input member 12 transfers through the transfer gear set 450 in a fixed speed and torque ratio to the output member 14. The CVU 40 is preferably disengaged from the transfer gear set 450 during the fixed gear operation. Alternatively, the clutch 457 in this embodiment is a selectable one-way clutch or another suitable activatable clutch.

Figure 5:
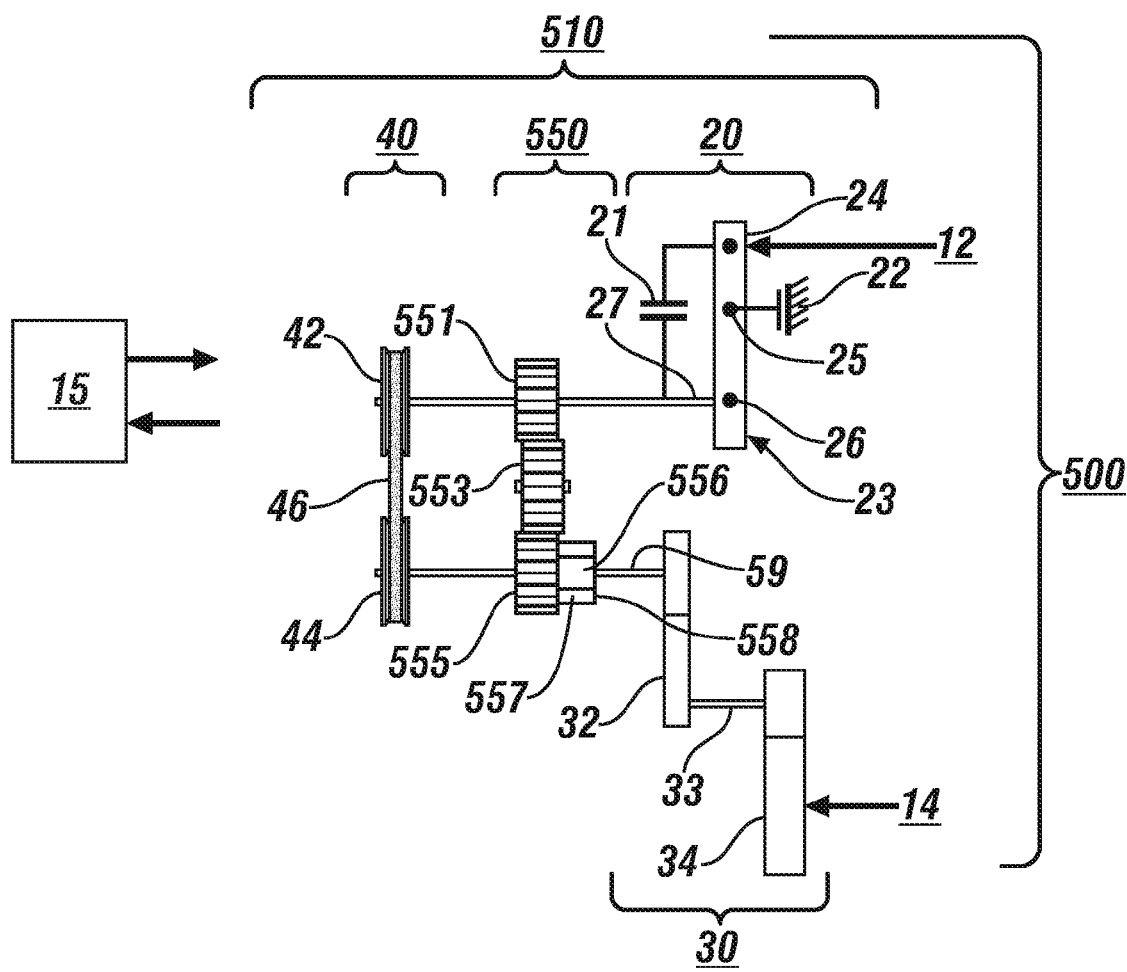

FIG. 5 schematically illustrates elements of another embodiment of a powertrain system 500 that includes a torque transmission device 510 employing a non-limiting embodiment of a continuously or infinitely variable transmission (CVU) 40 arranged to rotate in parallel with an embodiment of a transfer gear set 550 to transfer torque between input member 12 via input gear set 20 and output member 14 via differential gear set 30. In one embodiment, the input member 12 couples to a torque-generative device or prime mover such as an internal combustion engine or an electric machine. In one embodiment, the output member 14 couples to a driveline to transfer torque to tractive wheels. The CVU 40, input member 12, input gear set 20, output member 14 and differential gear set 30 are analogous to the corresponding elements described with reference to FIG. 1.

The transfer gear set 550 includes a first gear 551, a second gear 555, a coupling mechanism 553 and a clutch 557. The first gear 551 is preferably coaxial with the first rotating member 27 and the second gear 555 is preferably coaxial with the second rotating member 59. In this embodiment, the first and second gears 551, 555 are toothed sprockets and the coupling mechanism 553 is a continuous chain that engages the teeth of both the first and second gears 551, 555. As such, the first and second gears 551, 555 can rotate in concert at a fixed ratio. In one embodiment, the first and second gears 551, 555 are configured in an overdrive ratio such that rotational speed input to the first gear 551 is multiplied through the second gear 555 to the second rotating member 59. Alternatively, the first and second gears 551, 555 can be configured in an underdrive ratio or a 1:1 ratio. In this embodiment, the first gear 551 rotatably couples to the first rotating member 27 and rotates in concert at all times.

The clutch 557 in this embodiment is a dog clutch that includes a first element 556 and a second element 558. In this embodiment, the second rotating member 59 couples to the first element 556 of the clutch 557 and the second gear 555 couples to the second element 558 of the clutch 557. In one embodiment, the CVU 40 is controlled to synchronize rotations of the first and second elements 556, 558 to effect clutch engagement. A synchromesh configuration may be employed in concert with the CVU 40 to synchronize rotations of the first and second elements 556, 558 to effect clutch engagement in one embodiment. When the clutch 557 is disengaged, the first element 556 rotates independently of the second element 558, and thus the second rotating member 59 rotates independently of the second gear 555. Under such conditions, torque transferred from the input member 12 transfers through the CVU 40 to the output member 14. When the clutch 557 is engaged, the first element 556 rotates in concert with the second element 558 and thus the second rotating member 59 rotates in concert with the second gear 555. Under such conditions, torque transferred from the input member 12 transfers through the transfer gear set 550 in a fixed speed and torque ratio to the output member 14. The CVU 40 is preferably disengaged during the fixed gear operation. Alternatively, the clutch 557 in this embodiment can be a friction clutch.

A controller 15 is employed to control each embodiment of the powertrain system described with reference to FIGS. 1-5 that includes a multi-mode torque transmission device employing CVU 40 arranged to rotate in parallel with a transfer gear set to transfer torque between input member 12 and output member 14 in either a continuously variable state or a fixed gear state. The controller 15 monitors sensor inputs and executes control routines to determine control parameters for actuators to control operation of various powertrain elements including the CVU 40. Driver input devices such as an accelerator pedal and associated accelerator pedal position sensor can be monitored to determine an operator torque request. Various sensors are suitably positioned for sensing and providing signals, including, e.g., an input speed sensor monitoring rotation of the input member 12, variator speed sensor(s) monitoring the variator 40 and an output speed sensor monitoring rotation of the output member 14. The input speed sensor and output speed sensor may be any suitable rotation position/speed sensing device, such as a Hall-effect sensor. The controller 15 may include digital processing capability that issues control signals based on input signals such as vehicle speed and engine torque. The controller 15 and similar terms control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds. Communications between controllers and between controllers, actuators and/or sensors may be accomplished using a direct wired link, a networked communications bus link, a wireless link or any another suitable communications link.

The gains in transmission efficiency associated with operation of the system described herein are manifested in terms of reduced pumping losses, reduced spin losses, reduced CVU belt losses and reduced final drive torque losses when operating in the fixed gear mode.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A torque transmission device to transfer torque between a transmission input member and a transmission output member of a powertrain system, comprising:
    a continuously variable transmission (CVU) variator arranged in parallel with a transfer gear set between the transmission input member and the transmission output member;
    the CVU variator including a first pulley coupled to a first rotating member and a second pulley coupled to a second rotating member, wherein the first rotating member is rotatably coupled to the transmission input member and the second rotating member is rotatably coupled to the transmission output member;
    the transfer gear set including a first gear rotatably coupled to a second gear; and
    a clutch including a first rotating element and a second rotating element that rotate in concert when the clutch is activated;
        wherein the first rotating element of the clutch is coupled to the first rotating member;
        wherein the second rotating element of the clutch is coupled to the first gear of the transfer gearset;
        wherein the first gear rotates in a fixed ratio with rotation of the second gear;
        wherein the second gear is coupled to the second rotating member and is coupled to the second pulley;
        wherein the transfer gear set is disposed to transfer torque between the transmission input member and the transmission output member only when the clutch is engaged; and
        wherein the CVU variator is disposed to transfer torque between the transmission input member and the transmission output member when the clutch is disengaged.

2. The torque transmission device of claim 1, wherein the clutch comprises a dog clutch wherein the first rotating element meshingly engages and rotates in concert with the second rotating element when the clutch is activated.

3. The torque transmission device of claim 1, wherein the clutch comprises a friction clutch.

4. The torque transmission device of claim 1, wherein the clutch comprises a selectable one-way clutch.

5. The torque transmission device of claim 1, wherein the transmission input member is coupled to a torque actuator and the transmission output member is coupled to a driveline.

6. The torque transmission device of claim 1, wherein the first rotating member comprises an output member to a driveline and the second rotating member comprises an input member from a torque actuator.

7. The torque transmission device of claim 1, wherein the first and second gears of the transfer gear set comprise sprockets and the first gear rotatably couples to the second gear via a chain.

8. The torque transmission device of claim 1, wherein the first and second gears of the transfer gear set comprise multi-tooth gears and the first gear rotatably couples to the second gear via an intermediary gear.

9. The torque transmission device of claim 1, wherein the first gear of the transfer gear set selectively rotatably couples to the second gear in an overdrive configuration.

10. The torque transmission device of claim 1, wherein the first gear of the transfer gear set selectively rotatably couples to the second gear in an underdrive configuration.

11. The torque transmission device of claim 1, wherein the first gear of the transfer gear set selectively rotatably couples to the second gear in a unitary drive configuration.

12. A torque transmission device for a powertrain system, comprising:
   a continuously variable transmission (CVU) variator arranged in parallel with a transfer gear set;
   the CVU variator including a first pulley coupled to a first rotating member and a second pulley coupled to a second rotating member, wherein the first rotating member is coupled to a transmission input member and the second rotating member is coupled to a transmission output member;
   the transfer gear set including a first gear rotatably coupled to a second gear;
   wherein the clutch includes a first rotating element and a second rotating element that rotate in concert when the clutch is activated;
   wherein the first rotating element of the clutch is coaxial with and coupled to the first rotating member;
   wherein the second rotating element of the clutch is coaxial with and coupled to the first gear;
   wherein the first gear rotates in a fixed ratio with rotation of the second gear; and
   wherein the second gear is coaxial with and coupled to the second rotating member and the second pulley;
   wherein the first pulley of the CVU variator disengages from the transfer gear set when the first gear of the transfer gear set rotatably couples to the second gear via activation of the clutch;
   wherein the transfer gear set is disposed to transfer torque between the transmission input member and the transmission output member only when the clutch is engaged; and
   wherein the CVU variator is disposed to transfer torque between the transmission input member and the transmission output member when the clutch is disengaged.

13. The torque transmission device of claim 12, wherein the clutch comprises a dog clutch wherein the first rotating element meshingly engages and rotates in concert with the second rotating element when the clutch is activated.

14. The torque transmission device of claim 12, wherein the clutch comprises one of a friction clutch or a selectable one-way clutch.

15. The torque transmission device of claim 12, wherein the transmission input member is coupled to a torque actuator and the transmission output member is coupled to a driveline.

16. The torque transmission device of claim 12, wherein the first rotating member comprises an output member to a driveline and the second rotating member comprises an input member from a torque actuator.

17. The torque transmission device of claim 12, wherein the first and second gears of the transfer gear set comprise sprockets and the first gear rotatably couples to the second gear via a chain.

18. The torque transmission device of claim 12, wherein the first and second gears of the transfer gear set comprise multi-tooth gears and the first gear rotatably couples to the second gear via an intermediary gear.

19. The torque transmission device of claim 12, wherein the first gear of the transfer gear set selectively rotatably couples to the second gear in an overdrive configuration.

20. The torque transmission device of claim 12, wherein the first gear of the transfer gear set selectively rotatably couples to the second gear in an underdrive configuration.

* * * * *